(12) United States Patent
Beno

(10) Patent No.: US 7,874,842 B2
(45) Date of Patent: Jan. 25, 2011

(54) MARKER BOARD

(75) Inventor: Steven J. Beno, Gurnee, IL (US)

(73) Assignee: ACCO Brands USA LLC, Lincolnshire, IL (US)

( * ) Notice: Subject to any disclaimer, the term of this patent is extended or adjusted under 35 U.S.C. 154(b) by 1097 days.

(21) Appl. No.: 11/552,667

(22) Filed: Oct. 25, 2006

(65) Prior Publication Data

US 2007/0099510 A1    May 3, 2007

Related U.S. Application Data

(60) Provisional application No. 60/731,131, filed on Oct. 28, 2005.

(51) Int. Cl.
*B43L 1/00*    (2006.01)
(52) U.S. Cl. ...................................... 434/408
(58) Field of Classification Search ................ 434/365, 434/408, 409, 421, 425, 429; D19/51; 40/768, 40/771
See application file for complete search history.

(56) References Cited

U.S. PATENT DOCUMENTS

| | | |
|---|---|---|
| 227,662 A | 5/1880 | Thompson |
| D39,640 S | 10/1908 | Eustis |
| 1,844,545 A | 2/1932 | Donaldson |
| 2,501,474 A | 3/1950 | Martin |
| 3,047,970 A | 8/1962 | Bleiberg |
| 4,161,834 A | 7/1979 | Hendricks, Jr. |
| D280,745 S | 9/1985 | Cobb |
| 4,648,189 A | 3/1987 | Michel |
| D300,642 S | 4/1989 | Pawlik et al. |
| 5,010,671 A | 4/1991 | Stonehouse |
| D354,087 S | 1/1995 | Dunlap et al. |
| 5,527,568 A | 6/1996 | Boone et al. |
| 5,547,198 A | 8/1996 | Kaiser |
| D382,598 S | 8/1997 | Schroeppel |
| 5,655,323 A * | 8/1997 | Lassoff ...................... 40/611.1 |
| D393,001 S | 3/1998 | Mayo |
| 5,725,380 A | 3/1998 | Kennelly |
| 5,743,414 A * | 4/1998 | Baudino ..................... 211/69.1 |
| D399,264 S | 10/1998 | Klink |
| D402,696 S * | 12/1998 | Rosen ......................... D19/52 |
| 5,948,498 A * | 9/1999 | Bianco et al. ................. 428/81 |
| 5,987,825 A | 11/1999 | Rosen |
| 6,007,891 A * | 12/1999 | Davis et al. .................. 428/81 |
| 6,067,266 A | 5/2000 | Donelan |
| D427,641 S | 7/2000 | Palmer |
| 6,092,672 A | 7/2000 | Harris et al. |
| D443,655 S | 6/2001 | Chaikel et al. |

(Continued)

OTHER PUBLICATIONS

General Binding Corporation, Quartet Visual Communication and Organization Solutions product catalogue, Jul. 2005, pp. 13, 19-20.

(Continued)

*Primary Examiner*—Kurt Fernstrom
(74) *Attorney, Agent, or Firm*—Michael Best & Friedrich LLP

(57) ABSTRACT

A display board assembly includes a polymeric board having edges, a backing coupled with the polymeric board and configured to engage a mounting surface, and a dry erase surface coupled with the polymeric board. The backing is spaced inwardly from the edges of the polymeric board.

32 Claims, 16 Drawing Sheets

U.S. PATENT DOCUMENTS

| | | | |
|---|---|---|---|
| 6,263,602 | B1 | 7/2001 | Seiber et al. |
| 6,263,604 | B1 | 7/2001 | Williams |
| 6,265,074 | B1 | 7/2001 | Shah et al. |
| 6,464,507 | B1 * | 10/2002 | Bailey ................. 434/247 |
| 6,530,664 | B2 | 3/2003 | Vanderwerf et al. |
| 6,620,500 | B2 | 9/2003 | Sweet et al. |
| 6,647,652 | B1 | 11/2003 | Seiber et al. |
| 6,648,051 | B1 | 11/2003 | Young |
| 6,666,424 | B2 | 12/2003 | Richardson |
| D489,031 | S | 4/2004 | Leibman |
| 6,736,644 | B1 * | 5/2004 | Vaughn ................. 434/408 |
| 6,775,935 | B1 * | 8/2004 | Cohen et al. ............ 40/600 |
| D496,068 | S * | 9/2004 | Mandel ................. D19/36 |
| 6,787,225 | B2 | 9/2004 | Dawson et al. |
| 6,837,715 | B2 * | 1/2005 | Beno ................. 434/408 |
| 6,866,516 | B2 | 3/2005 | Smith et al. |
| 6,893,266 | B2 | 5/2005 | Donelan |
| D506,074 | S | 6/2005 | Chen et al. |
| D507,302 | S * | 7/2005 | Chen et al. ............ D19/52 |
| 6,945,785 | B2 | 9/2005 | Sohl et al. |
| D519,117 | S | 4/2006 | Lewis |
| 7,431,590 | B2 * | 10/2008 | Gerhardt ................. 434/408 |
| 2001/0024720 | A1 | 9/2001 | Sweet et al. |
| 2002/0009703 | A1 | 1/2002 | Owen |
| 2002/0095840 | A1 | 7/2002 | Seiber et al. |
| 2003/0008095 | A1 | 1/2003 | Meccia |
| 2004/0018345 | A1 | 1/2004 | Athorn-Telep et al. |
| 2004/0077497 | A1 | 4/2004 | Korane et al. |
| 2004/0081844 | A1 | 4/2004 | Bharti et al. |
| 2004/0110032 | A1 | 6/2004 | Staadecker et al. |
| 2004/0229202 | A1 | 11/2004 | Sohl et al. |
| 2005/0017449 | A1 | 1/2005 | Belcher et al. |
| 2005/0022439 | A1 | 2/2005 | Crump |
| 2005/0132625 | A1 | 6/2005 | Schwester |
| 2005/0186439 | A1 | 8/2005 | Staadecker et al. |

OTHER PUBLICATIONS

Admitted prior art Quartet Motion Marker Board System, 4 pages and Statement of Relevance.

ACCO® Brands, 2005 Fact Book, Feb. 2005, pp. 173, 203.

ACCO® NOBO Marker Board System sold in Europe at least as early as Dec. 2006, 5 pages.

Admitted Prior Art Umbra Swipeboard (printed Apr. 7, 2006), http://www.umbra.com/ustore/product.do?product=035702&colour=060, p. 1.

Admitted Prior Art Franken Dry Erase Board (Date Unknown), p. 1.

Admitted Prior Art (Manufacturer Unknown) (Date Unknown), p. 1.

Admitted Prior Art Topdeq, Nice Notice Marker Board (printed Apr. 7, 2006), http://www.topdeq.com/topdeq/product.do?catid=us_90&prodid=pp_NICE+NOTICE, p. 1.

The Board Dudes Clear Acrylic Dry Erase Board (printed Apr. 7, 2006), http://store.yahoo.com/boarddudesdirect/clacdryerbo1.html, p. 1 & 2.

Admitted Prior Art Cristallo Office Signs (Date Unknown), p. 1.

* cited by examiner

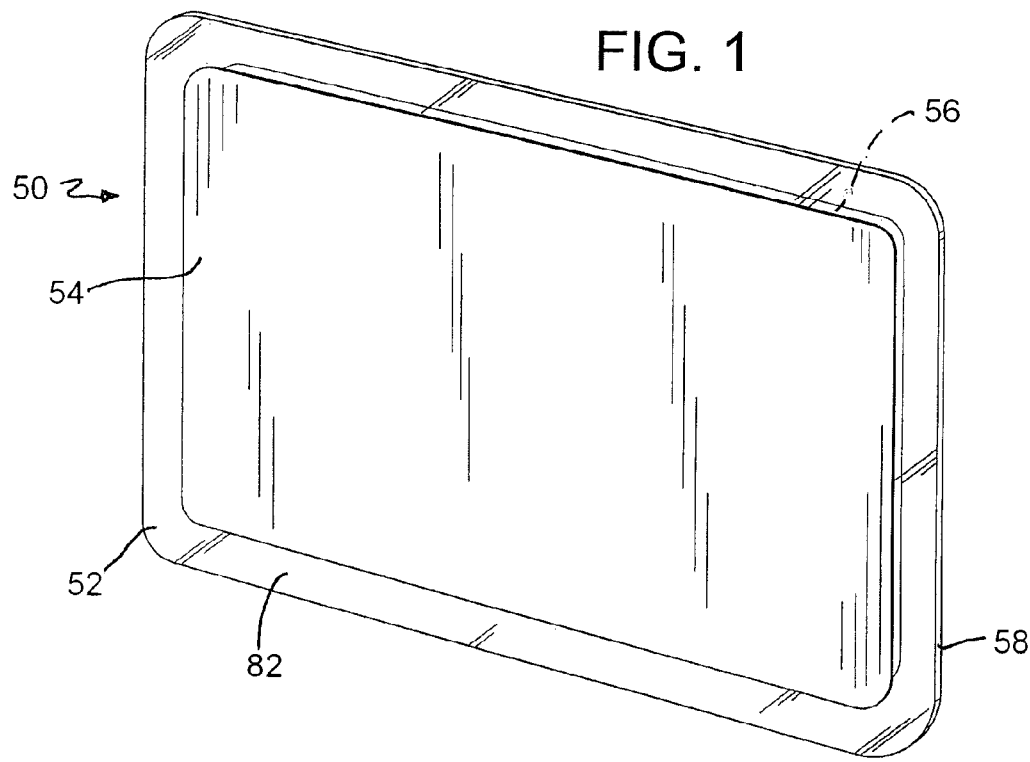
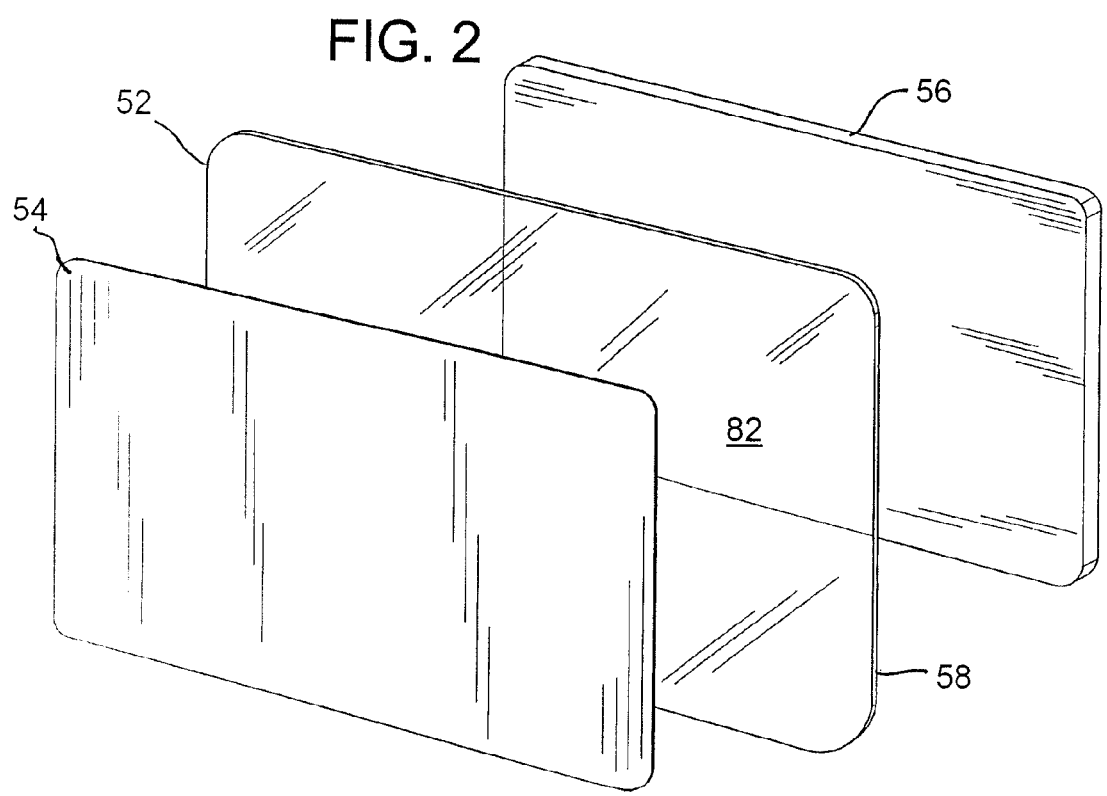

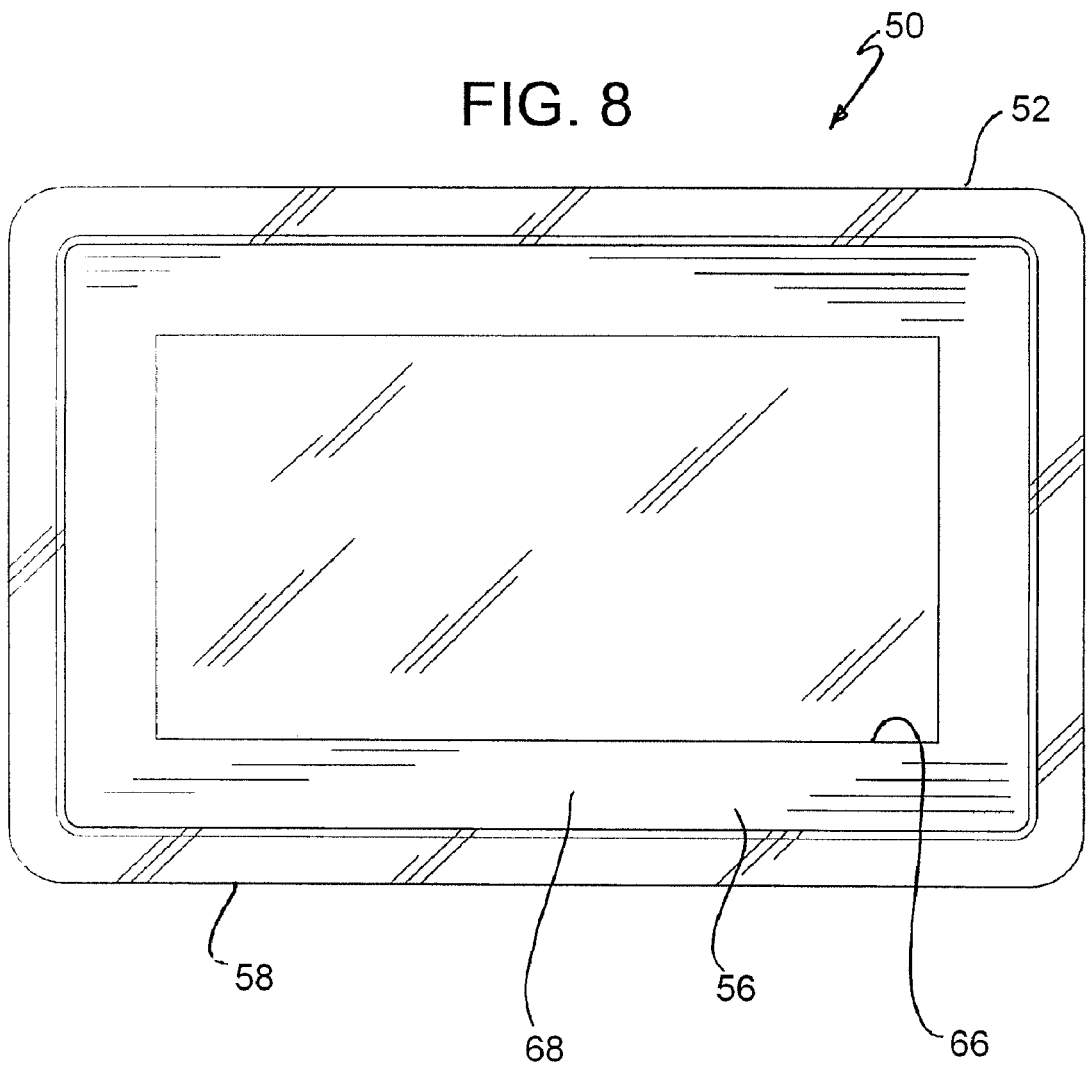

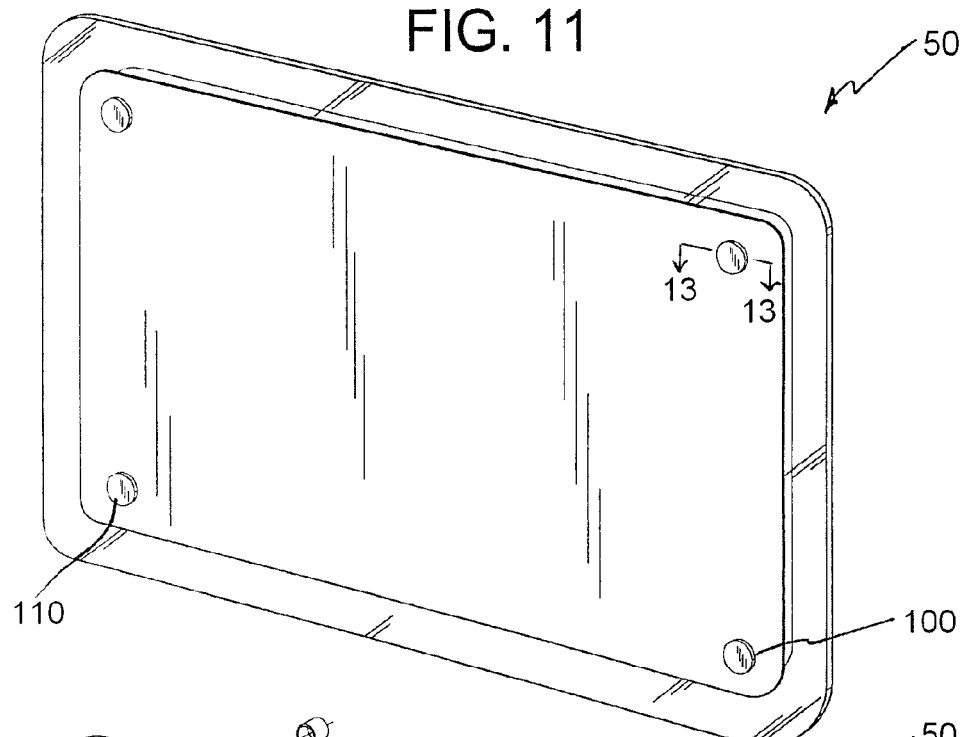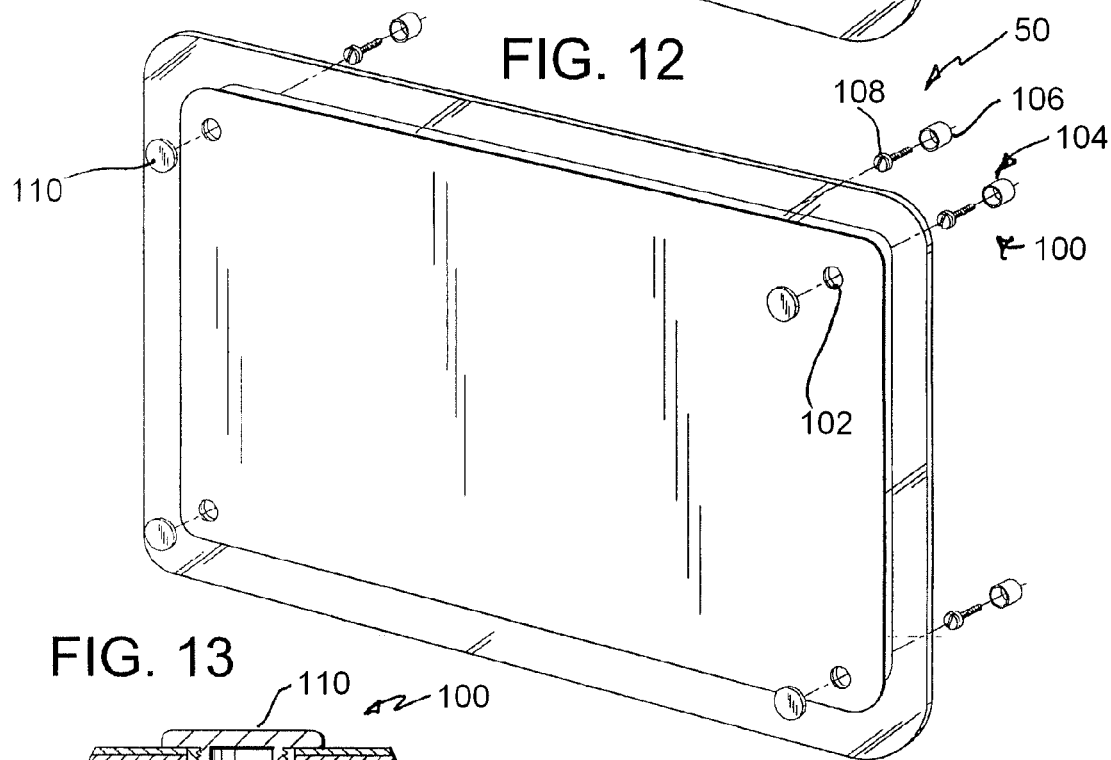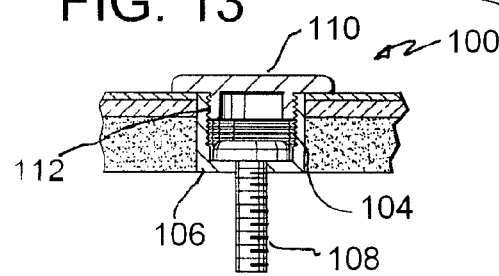

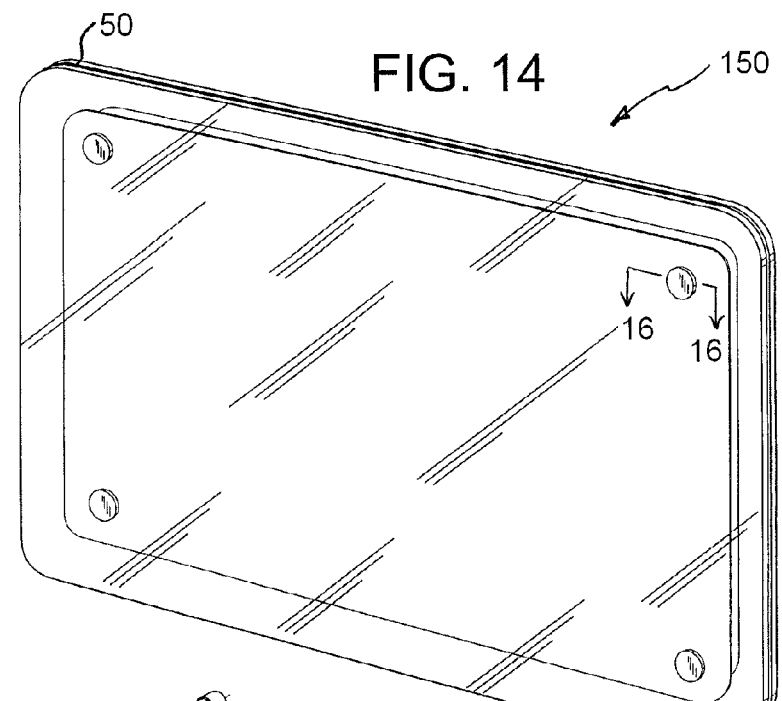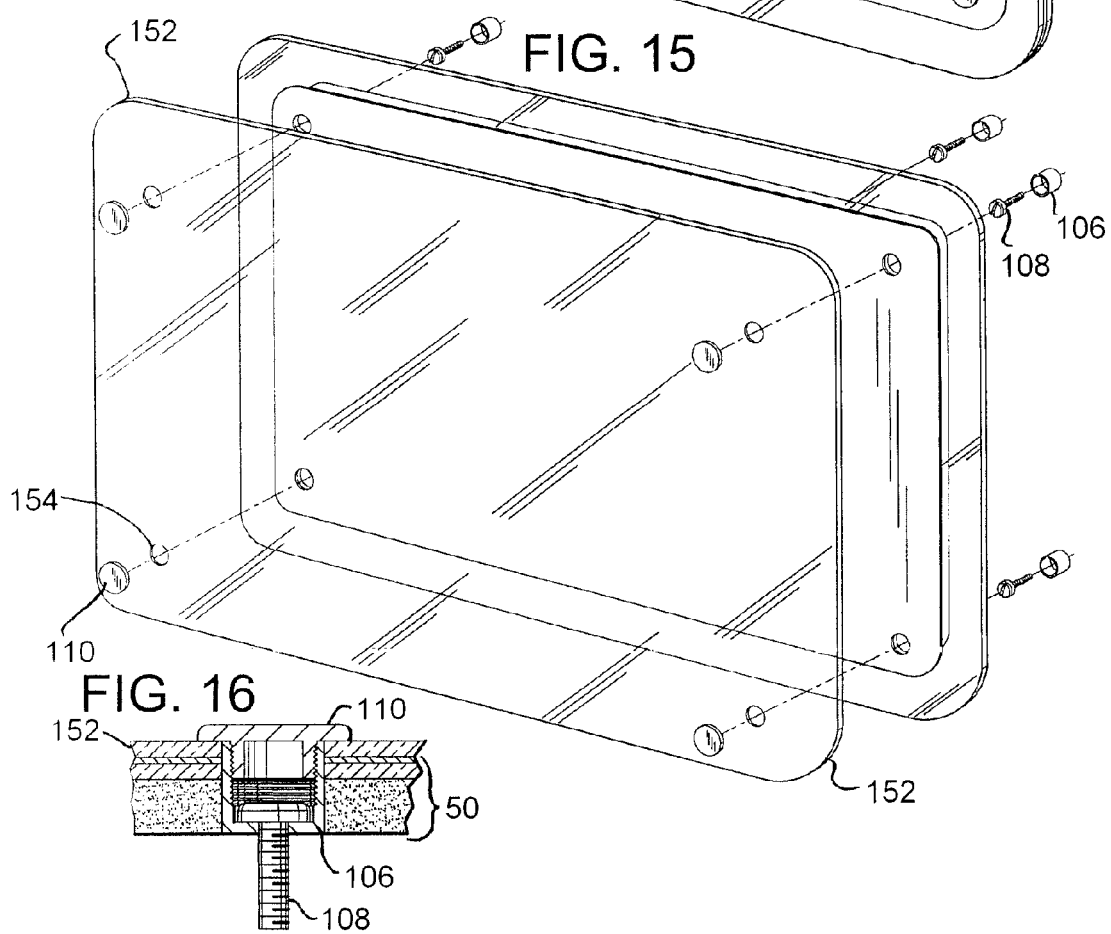

MARKER BOARD

RELATED APPLICATIONS

This application claims the benefit of U.S. Provisional Patent Application No. 60/731,131 filed Oct. 28, 2005, the entire contents of which is incorporated by reference herein.

FIELD OF THE INVENTION

The present invention relates to display boards for use with dry erase markers, and, more specifically, the invention pertains to a polymeric board comprising a dry erase surface.

BACKGROUND

While dry erase boards are known, their appearance and structure have generally limited their usefulness in a business environment that demands a certain level of professionalism. So-called "white boards" often include a markable surface, such as melamine, porcelain coated paper, metal or film, bounded by a metal frame or the like. Such dry erase boards are not typically considered desirable for an upscale office environment in that they may detract from, rather than enhance, the décor. Unless relatively expensive screen or other processes are utilized, such boards may not generally be customized for a particular environment or application. Moreover, such boards are of limited usefulness in that they are typically utilized merely as writing boards that allow the preparation of only a single sheet of markings, and must be erased for continued marking.

SUMMARY

The invention provides a multilayered dry erase board construction that not only provides an attractive, modern appearance, but also facilitates customization as well as the utilization and storage of accessories. The board assembly includes a multilayer construction of a polymeric board with a backing that is spaced inwardly from the edges of the polymeric board such that the backing spaces the edges of the polymeric board away from a mounting surface. In this way, the edges of the polymeric board may be utilized for the attachment of accessories. The polymeric board may be colored or clear, opaque, transparent, or translucent. In a preferred design where the polymeric board is transparent or translucent, the elements behind the polymeric board, be it the backing or the mounting surface, etc., will be visible through the polymeric board. In this way, the board assembly will reflect and complement the environment in which the board assembly is displayed.

The board assembly further preferably includes a dry erase surface on at least a portion of the face of polymeric board, the dry erase surface being applied directly to the polymeric board or to a separate sheet that is secured to the face of the polymeric board. In an embodiment where the dry erase surface is applied to a metallic sheet, the dry erase surface may additionally accept magnets for the attachment of accessories. If the dry erase surface is applied directly to the polymeric board, the dry erase surface may include color or it may be transparent such that the polymeric board is visible therethrough. In an embodiment where both the dry erase surface and the polymeric board are transparent, the backing will be visible therethrough.

The layers of the board assembly may be economically fabricated in that they may be die cut, for example, from sheets of material. Additionally, the board assembly may be substantially planar or may comprise simple or complex geometries and bends in that one or more of the layers may be vacuum formed or heat bent to a desired structure. Moreover, any or all of the layers of the board assembly may include cut-outs or knock-outs that create voids for visual effect or attachment of accessories. For example, the polymeric board and dry erase surface may include voids such that the backing is assessable for use as a push pin board. Alternately or additionally, the backing may include voids to minimize material costs or for the placement of display items, such as customizing indicia, subjacent the polymeric board. Alternately or additionally, the board assembly may include voids extending through each of its layers to provide, for example, for storage of accessories, including customizing indicia or unrelated items such as a cell phone.

The board assembly may be coupled to a mounting surface by any appropriate method including, for example, hooks, magnets, double sided tape or foam, or other mounting structure. The board assembly may further include additional polymeric boards or sheets that may be layered on and coupled to the board assembly. The additional polymeric boards or sheets may include a dry erase surface, and may be colored or clear, opaque, transparent, or translucent. The additional polymeric boards or sheets may be utilized for additional markings, the sheets being rollable to facilitate storage and/or transport. They may further be utilized to economically customize the board assembly by sandwiching customizing indicia between the board assembly and the additional board(s) or sheet(s), or by directly customizing the additional board(s) or sheets(s), which are then coupled to the board assembly. In this way, the additional board(s) or sheet (s) may be readily and more economically customized than the board assembly itself.

These and other features of the invention will be apparent to those skilled in the art upon reading the following detailed description and upon reference to the drawings.

BRIEF DESCRIPTION OF THE DRAWINGS

FIG. 1 is a perspective view of a board according to teachings of the invention.

FIG. 2 is an exploded view of the board of FIG. 1.

FIG. 8 is a bottom view of an alternate embodiment of a board constructed in accordance with teachings of the invention.

FIG. 11 is a perspective view of another alternate embodiment of a board assembly constructed in accordance with teachings of the invention.

FIG. 12 is a partially exploded perspective view of the board assembly of claim 11.

FIG. 13 is a fragmentary cross sectional view of an exemplary attachment mechanism of FIGS. 11 and 12 taken along line 13-13 in FIG. 11.

FIG. 14 is a perspective view of another alternate embodiment of a board assembly constructed in accordance with teachings of the invention.

FIG. 15 is an exploded perspective view of the board assembly of claim 14.

FIG. 16 is a fragmentary cross sectional view of an exemplary attachment mechanism of FIGS. 14 and 15 taken along line 16-16 in FIG. 14.

Figure 3:
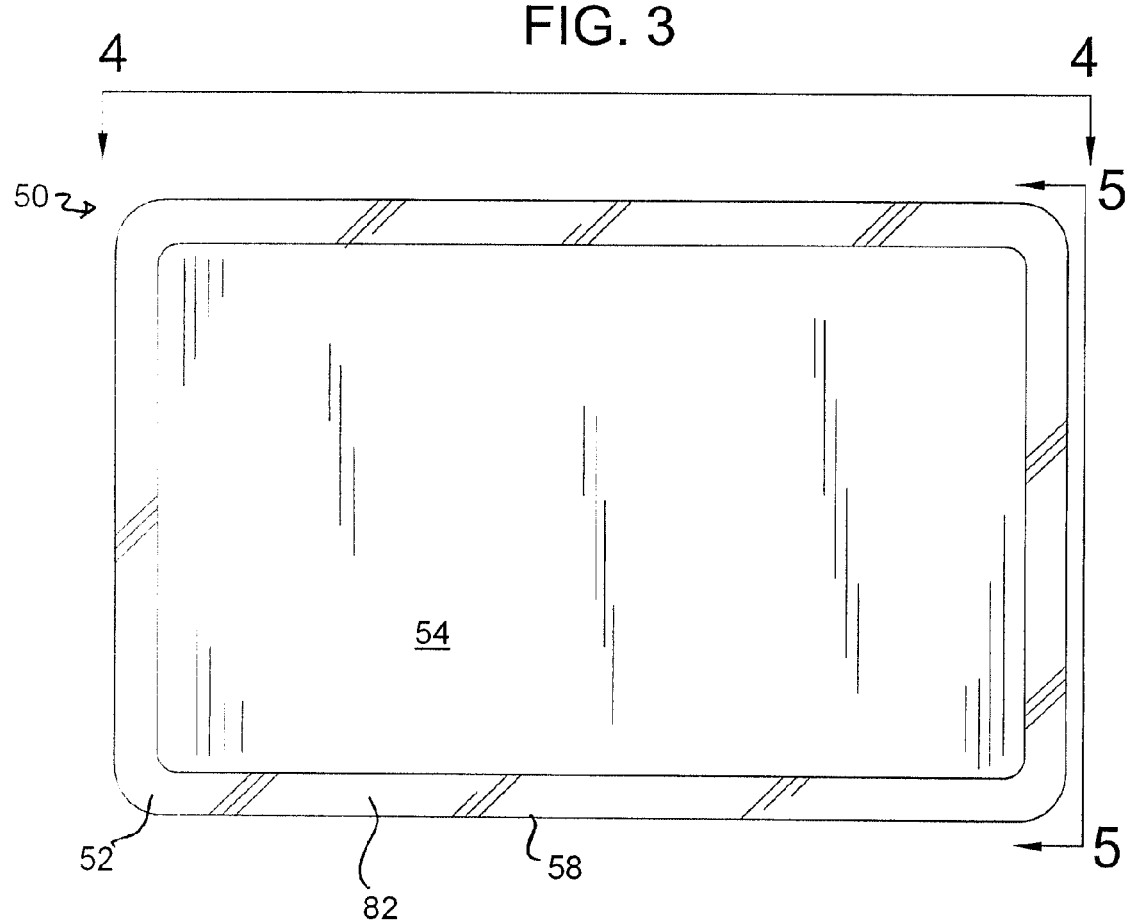
FIG. 3 is a plan view of the board of FIG. 1.
Figure 4:
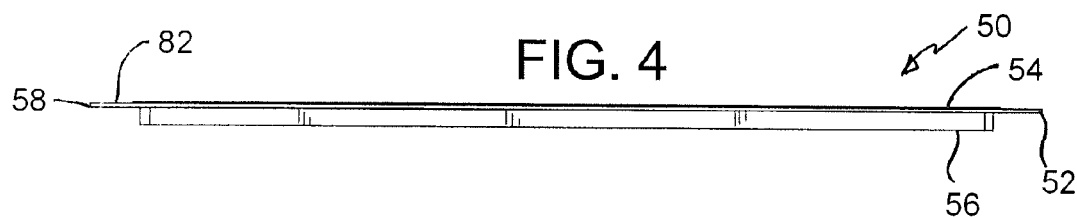
FIG. 4 is a side elevational view of the board of FIGS. 1 and 3 taken along line 4-4 in FIG. 3.
Figure 5:
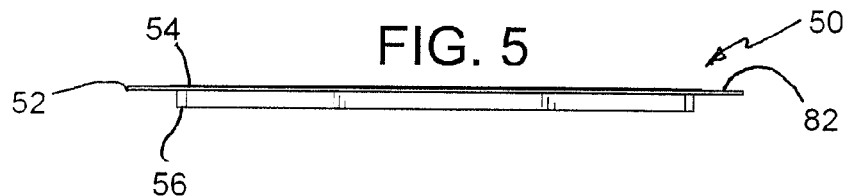
FIG. 5 is a side elevational view of the board of FIGS. 1, 3 and 4 taken along line 5-5 in FIG. 3.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including", "having", and "comprising" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Turning now to the drawings, there is shown in FIG. 1 a board assembly 50 constructed in accordance with teachings of the invention. The board assembly 50 comprises a multi-layer construction that includes a polymeric board 52 that presents a dry erase surface 54 along one side of the board 52, and a backing 56 along the other side of the board 52.

Figure 7:
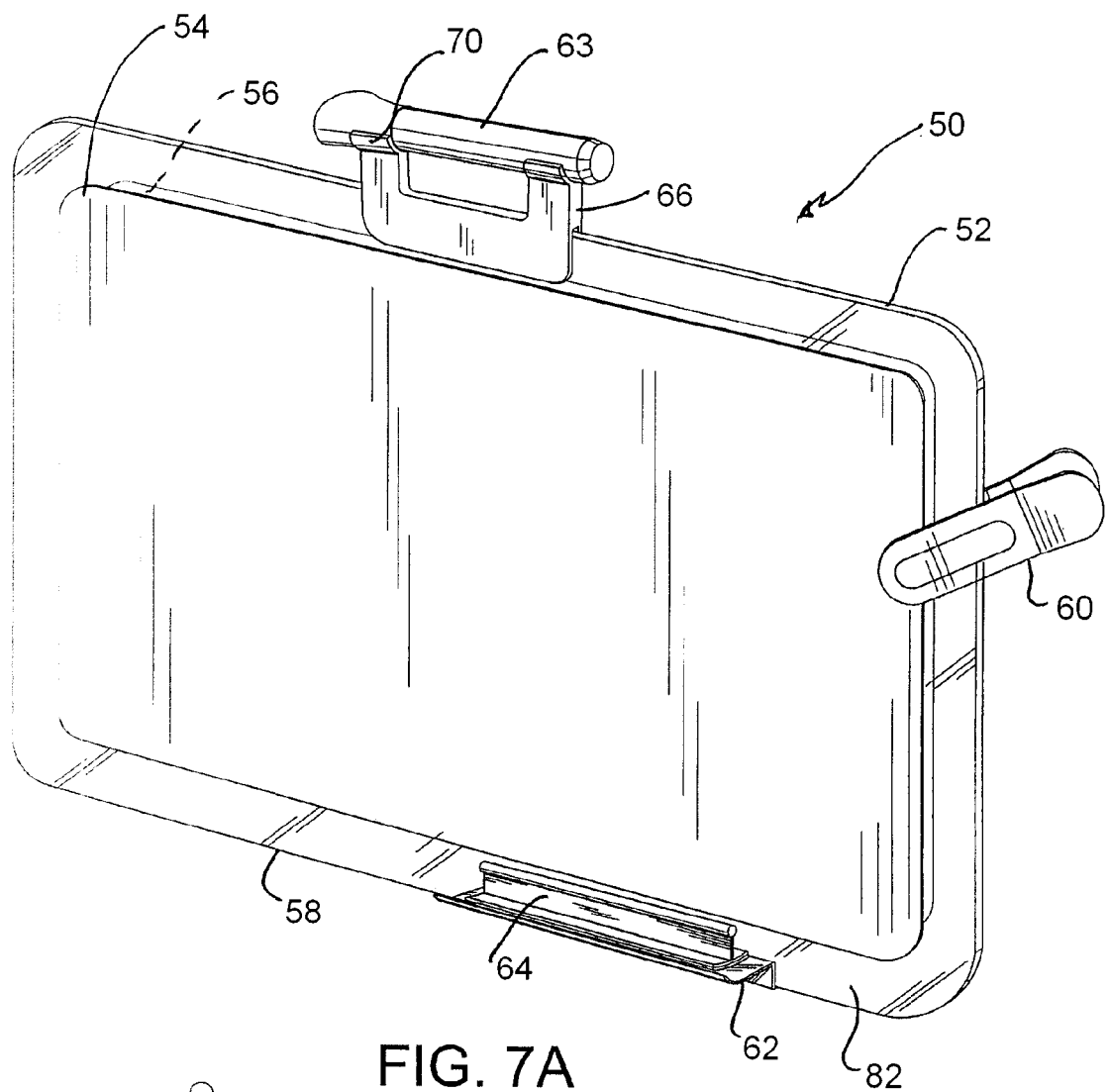
FIG. 7 is a perspective view of the board of FIGS. 1 and 3-6 with a pen, a tray, and a clip.
Figure 7A:
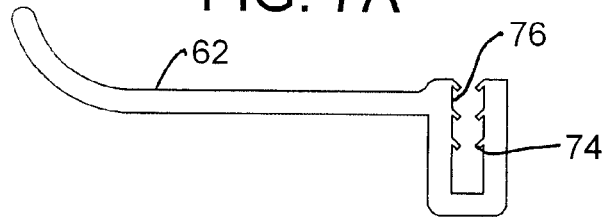
FIG. 7a is a side view of the tray of FIG. 7.
Figure 17:
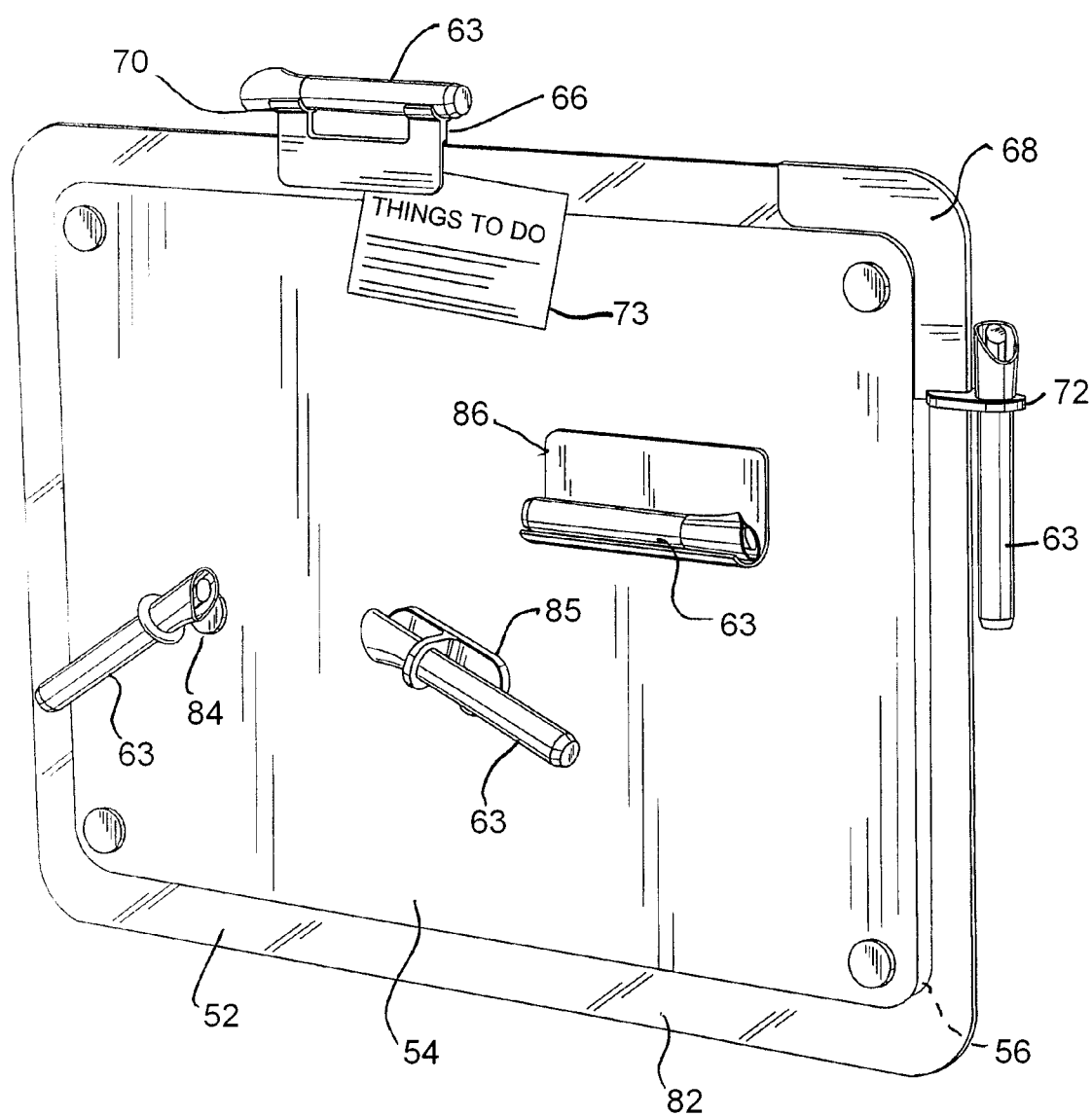
FIG. 17 is a perspective view of an embodiment of the invention illustrating various accessory attachments.

According to an aspect of the invention, the backing 56 is spaced away from the edges 58 of the polymeric board 52, and spaces the polymeric board 52 away from a mounting surface, such as a wall. As a result, accessories, such as, for example, clips 60 for the attachment of other articles, name or other display plates, and supports or trays 62 for supporting pens 63, an eraser 64 or other accessories, may be clipped or mounted to the edges of the polymeric board 52, providing the user added versatility over dry erase boards that are mounted flat to a mounting surface, as shown, for example, in FIGS. 7 and 17. The clips 60 maybe of various designs, including, for example, a simple spring biased clip 60, or channel clips, such as the edge or corner mounting channel clips 66, 68 shown in FIG. 17, which additionally include a support 70 and a sleeve 72, respectively, shown supporting pens 63. It will be appreciated that additional articles, such as small sheets 73, may be slid between the channel clips 66, 68 and the polymeric board 52 to attach the same. The channel clips and mountings may be of any appropriate design, simply slipping over the top or corner surface as shown in FIG. 17, for example, or they may include additional securing structure such as the resilient protrusions 74 co-extruded with the channel 76 of the tray 62, as shown in FIG. 7A.

The backing 56 may be formed of any appropriate material or materials that space the polymeric board 52 away from the mounting surface. For example, the backing may be formed of a molded polymeric foam, such as EVA. The backing 56 may be readily and cleanly die cut to any desired size and shape from sheets of such molded polymeric foam. Such polymeric foam not only provides a formed, stable structure upon which to mount the polymeric board 52, but such foam is lightweight, allowing the board assembly 50 to be mounted to a mounting surface without additional support structure that may be necessary for heavier boards. Additionally, such polymeric foam conforms to and absorbs minor irregularities in a mounting surface, facilitating mounting of the board assembly 50 to a variety of mounting surfaces. In the illustrated embodiment, the backing 56 is at least two times the thickness of the polymeric board 52.

Figure 6:
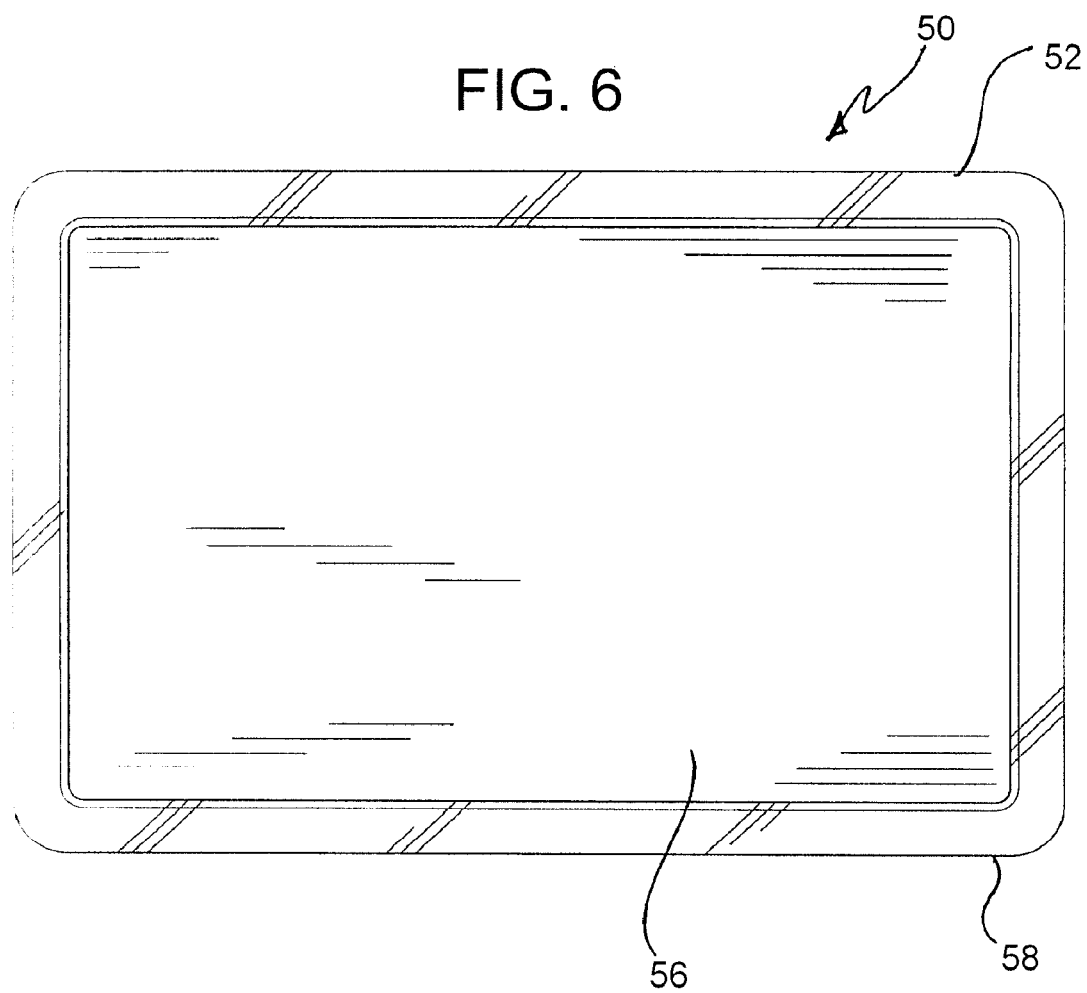
FIG. 6 is a bottom view of the board of FIGS. 1 and 3-5.

It will be appreciated that, while the backing 56 may be substantially continuous as shown in FIG. 6, the backing 56 may alternately include one or more voids 66, as shown, for example, in FIG. 8. Moreover, the backing 56 may include one or more materials or types of materials. For example, the backing 56 may include a peripheral frame 68 of foam material into which a less expensive material, such as cardboard (not shown) may be inserted. In this way, the foam provides an appealing presentation along the edges of the board assembly 50, while the inclusion of the cardboard material provides an economic alternative to a solid foam backing.

The polymeric board 52 may be formed of any appropriate material and by any appropriate method. Appropriate materials include, for example, acrylic or polyester materials. In a current embodiment, polyethylene terephthalate-glycol-modified (PETG) is utilized. While the polymeric board 52 may be opaque and/or of any desired color, the board 52 is preferably transparent or translucent such that environment behind the board assembly 50, such as the mounting surface, is visible or partially visible through the polymeric board 52 as it overlaps the backing 56.

To facilitate use of dry erase markers on the polymeric board 52, the board is provided with the dry erase surface 54 covering at least a portion the front surface 82 of the polymeric board 52. The dry erase surface 54 may be of known arrangements, such as melamine, porcelain coated paper, metal or film, which is then secured to the front surface 82 of the polymeric board 52 (see FIG. 2). When a metal base is utilized for the application of the dry erase coating, the dry erase surface will additionally function to hold magnets 84, 85, 86 that may be utilized to post attachments or hold accessories, as shown in FIG. 17. The dry erase surface 54 may cover the majority of the front surface 82 of the polymeric board 52, as shown in FIG. 1, or the dry erase surface 54 may include one or more cut outs therethrough to establish a design or otherwise reveal the polymeric board 52 below or, in the case of a transparent or translucent polymeric board 52, the backing 56 or other material below the polymeric board 52.

Figure 9:
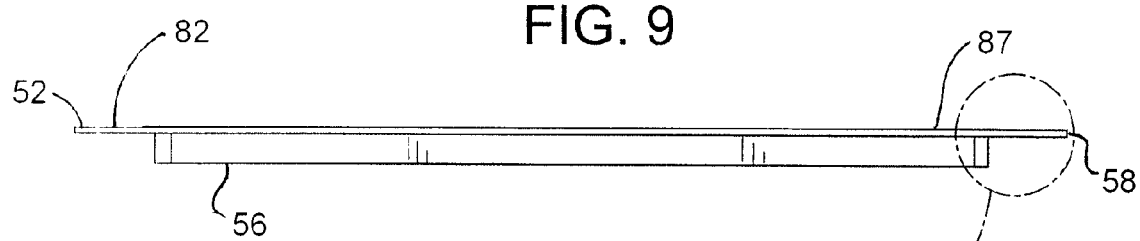
FIG. 9 is a side elevational view of another alternate embodiment of a board constructed in accordance with teachings of the invention.
Figure 9A:
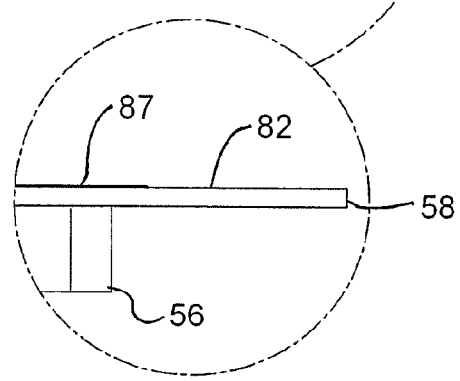
FIG. 9A is an enlarged fragmentary view of a portion of the view of FIG. 9.

Those of skill in the art will appreciate that the surface of a polymeric board may be utilized directly with dry erase markers. Left untreated, however, such a surface would eventually stain or discolor from the ink, resulting in an objectionable appearance to the board. As an alternative, however, the front surface 82 of the polymeric board 52 may be treated or coated directly to provide a dry erase surface 87 (see FIGS. 9 and 9A), rather than utilizing an intermediate layer, such as paper, metal or film 80. Any appropriate treatment that provides a dry erase surface 87 may be utilized. The surface treatment may be colored, or it may be clear such that the polymeric board 52 may be visible therethrough. As with the dry erase surface 54 discussed above, the treatment may cover the entire front surface 82 of the polymeric board 52 or be limited to part of the front surface 82, as shown, for example, in FIGS. 9 and 9A.

Figure 10:
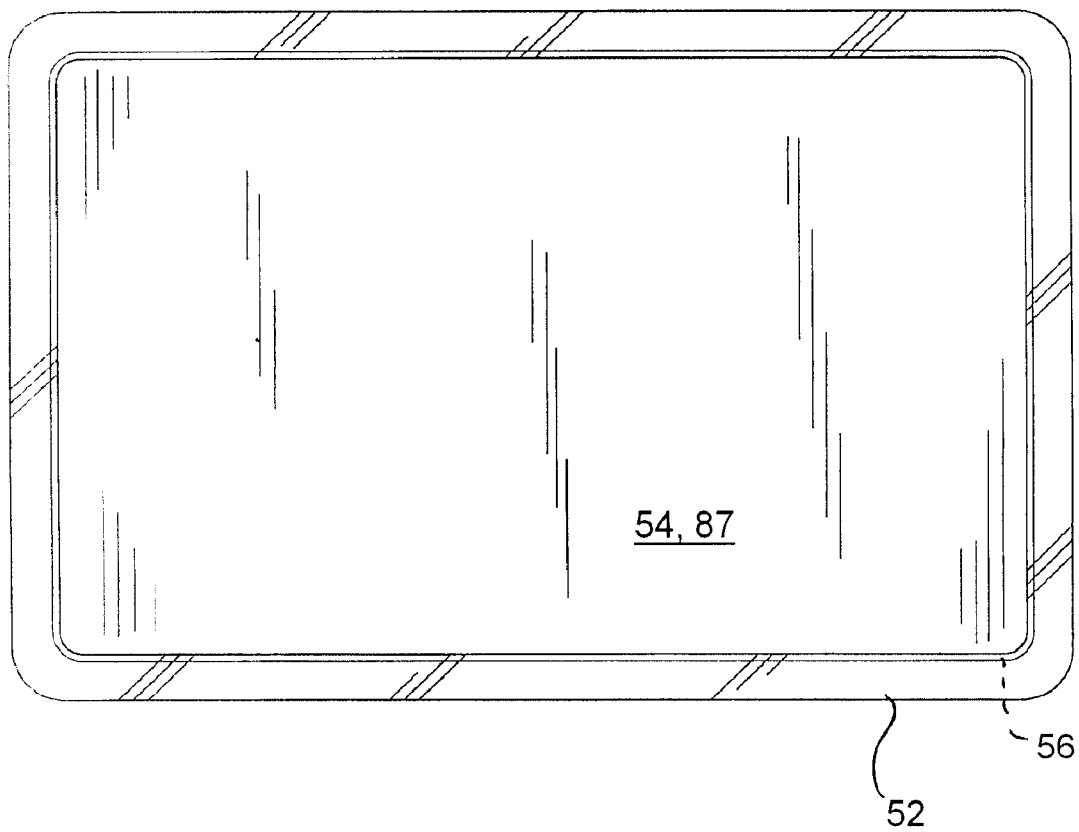
FIG. 10 is a plan view of another alternate embodiment of a board constructed in accordance with teachings of the invention.

In an embodiment of the invention, the dry erase surface 54, 87 is spaced from the edge of the polymeric board 52 to provide a frame type of appearance around the dry erase surface 54, 87, as shown in FIGS. 1-6. In such an embodiment wherein the polymeric board 52 is transparent or translucent and the backing 56 is of a smaller size than the dry erase surface 54, 87, the mounting or other surface behind the board assembly 50 would further be visible through this frame section about the periphery of the dry erase surface 54, 87. Similarly, where the polymeric board 52 is transparent or translucent and the backing 56 is larger than the dry erase surface 54, 87, the backing 56 as well as the mounting or other surface behind the board assembly 50 would be visible through this frame section about the periphery of the dry erase surface 54, 87, as shown, for example, in FIG. 10. In this way, the backing 56 provides the effect of secondary frame or matting around the dry erase surface 54, 87.

Figure 19:
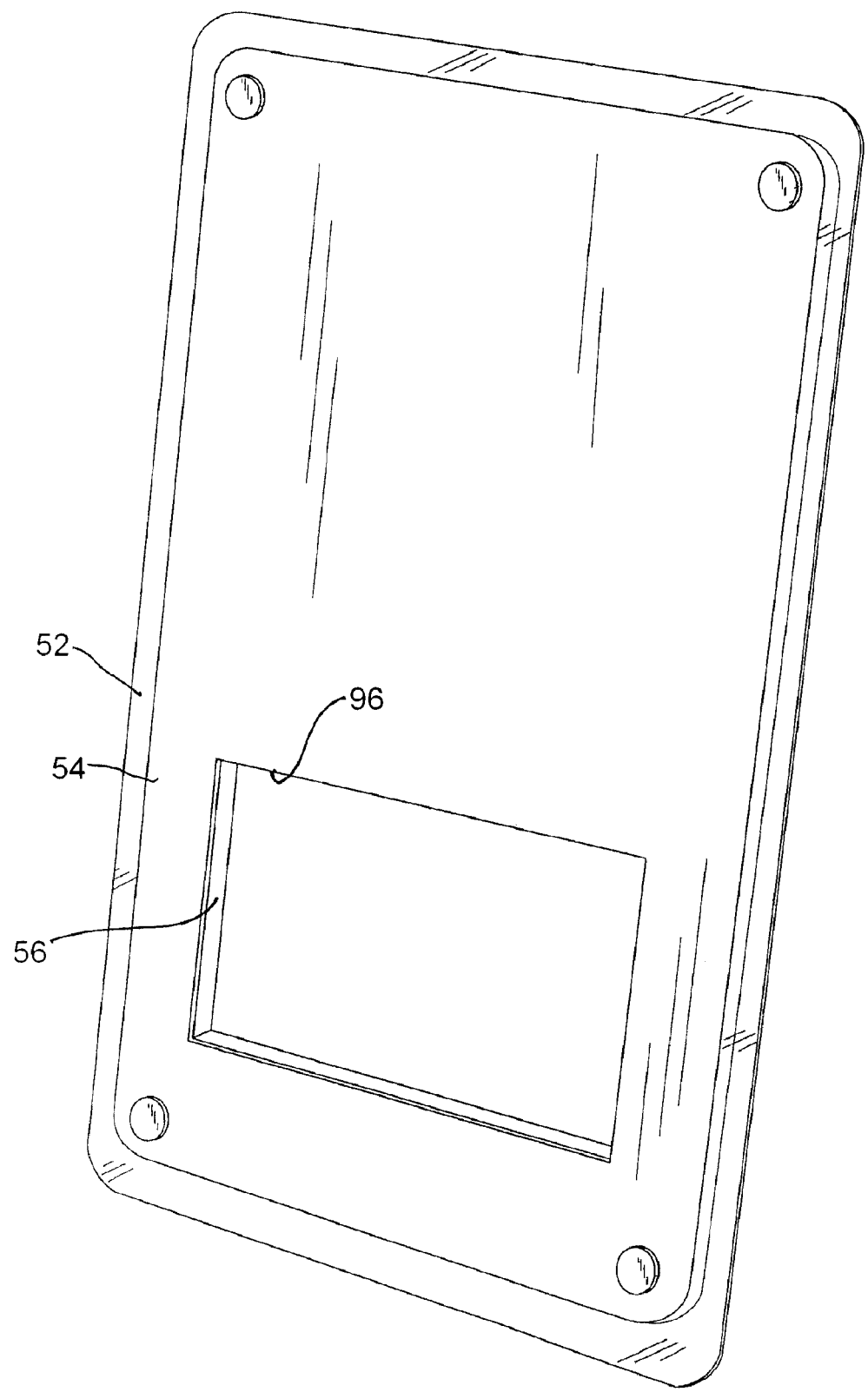
FIG. 19 is a perspective view of another alternate embodiment of a board assembly constructed in accordance with teachings of the invention.
Figure 20:
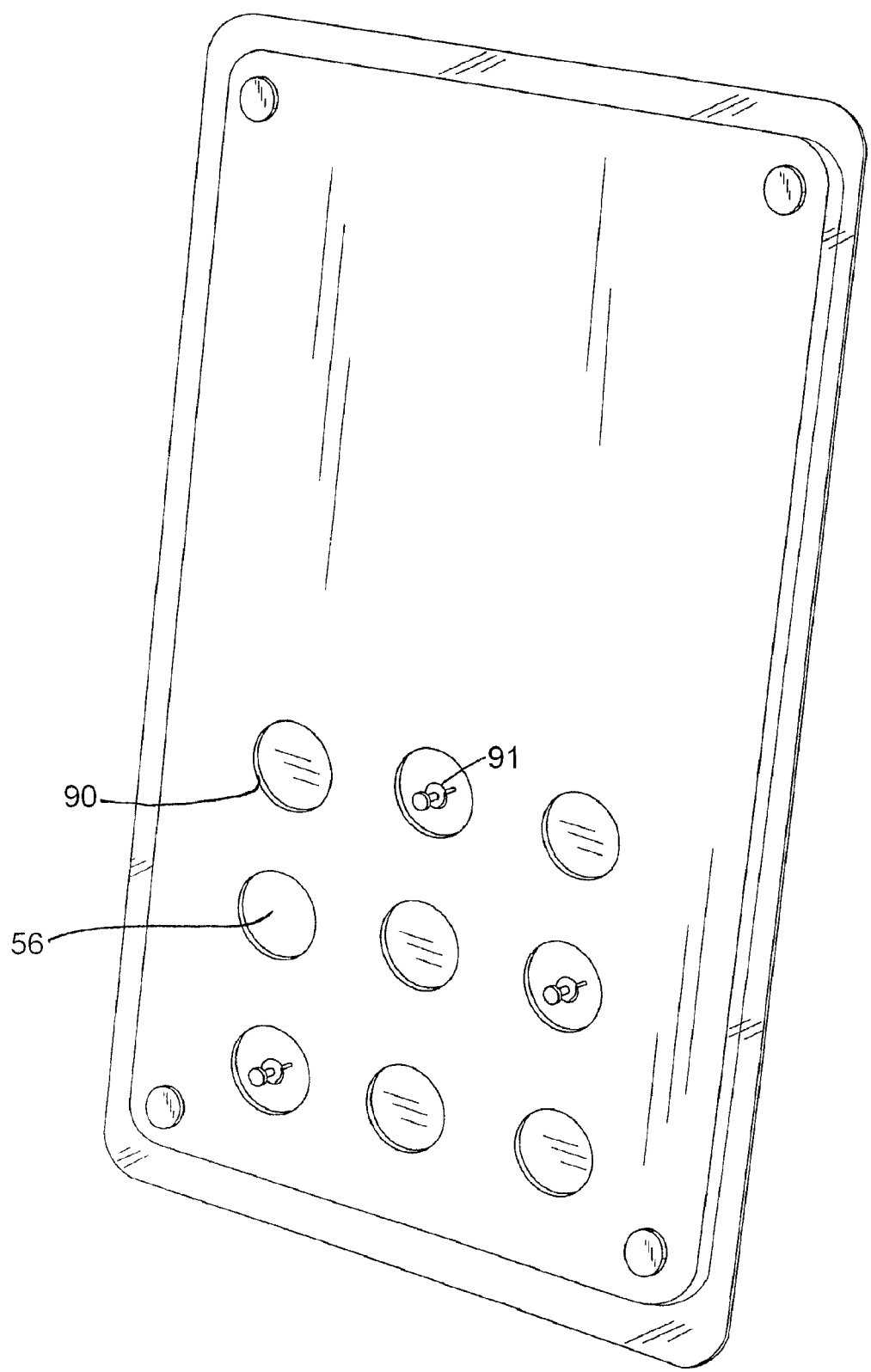
FIG. 20 is a perspective view of another alternate embodiment of a board assembly constructed in accordance with teachings of the invention.
Figure 22:
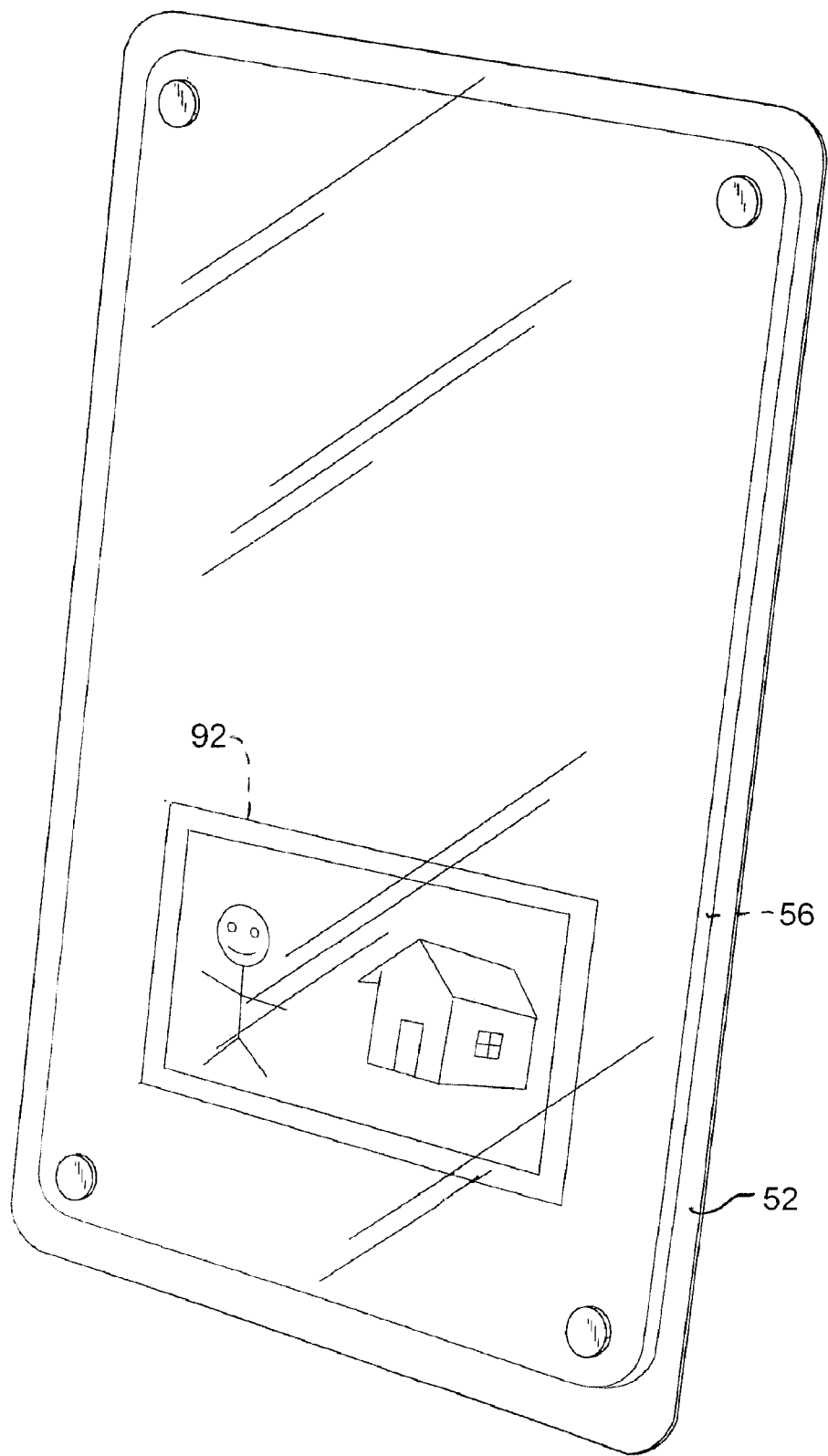
FIG. 22 is a perspective view of another alternate embodiment of a board assembly constructed in accordance with teachings of the invention.

As with the dry erase surface 54, 87 the polymeric board 52 and backing 56 may include one or more voids to reveal other structure, or facilitate attachment of accessories. For example, the polymeric board 52 and dry erase surface 54, 87 may include one or more voids which provide direct access to the structure below the board 52. In the embodiment shown in FIG. 20, the voids 90 provide access to the backing 56, which may be utilized as a pushpin board configured to receive pushpins 91. If, however, the backing 56 was not continuous behind the voids 90, the mounting surface would be visible. In an alternate embodiment illustrated in FIG. 22, the backing 56 contains one or more voids 92. In this embodiment, the backing 56 is cut to provide the void 92 for placement of a customizing agent, such as a photograph or sheet providing an emblem. The portion of the backing cut out of the void 92 is then replaced to retain the customizing agent in a viewable position below the polymeric board 52. In yet another embodiment, such as the embodiment illustrated in FIG. 19, each of the layers 52, 54, 56 is cut through to provide a void 96 that may be used to store accessories, including markers, an eraser, clips, or unrelated items such as a phone. It will thus be appreciated by those of skill in the art that the board assembly 50 may be provided in any number of designs and arrangements.

Figure 23:
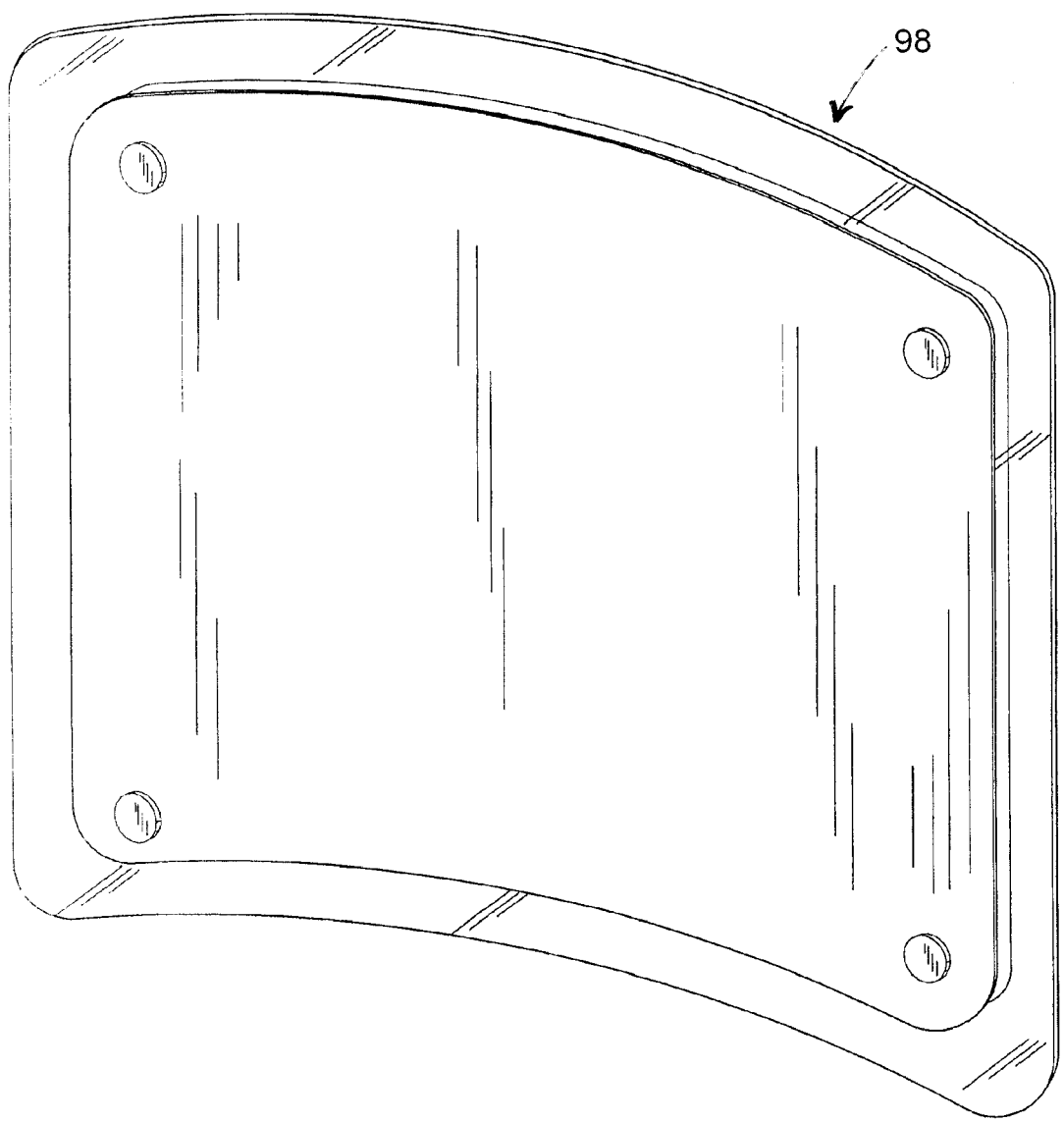
FIG. 23 is a perspective view of another alternate embodiment of a board assembly constructed in accordance with teachings of the invention.

The board assembly 50 may be provided not only in a flat structure, as shown, for example, in FIGS. 1-10, it may also be provided in complex structures. For example, the board assembly 98 may include angular or arcuate portions, as illustrated in FIG. 23. In fabricating the assembly, any appropriate method may be utilized, such as for example, flat cutting, vacuum forming or heat bending.

While an arcuate board 98 structure, such as the board illustrated in FIG. 23, may stand freely on a surface, the board assembly 50 may alternately include mounting structure 100 for coupling the assembly 50 to a mounting surface. The mounting structure may include any appropriate structure, such as, for example, magnets, double-sided tape or foam, hooks, etc. One such mounting structure 100 is illustrated in FIGS. 11-13 In this embodiment, the board assembly 50 is mounted by way of one or more bores 102 that receive one or more mounting protrusions 104 coupled to the mounting surface. As shown in FIG. 13, the mounting protrusions 104 may be, for example, simple CLIP shaped grommets 106, which are mounted to the mounting surface by a couple 108 such as a screw, rivet, nail or hook. The mounting protrusion including the coupler could alternately be formed as a single unit, such as, for example, a protrusion from which a needle-like hook extends at an angle, the hook being insertable into a padded fabric mounting surface.

Returning to FIG. 13, once the coupler 108 is secured to the mounting surface, the board assembly 50 may be disposed thereon by placing the bore 102 over the protrusion 104. A cap 110 may then be disposed over the bore 102 and coupled to the protrusion 104 to inhibit separation of the board assembly 50 from the protrusion 104 and mounting surface. Preferably, the cap 110 is removably coupled to the protrusion 104 by threads 112 (illustrated in FIG. 13), or a structure such as a bulbous portion received in a detent. It will be appreciated by those of skill in the art that alternate coupling structures or configurations may be utilized in accordance with the invention.

Figure 18:
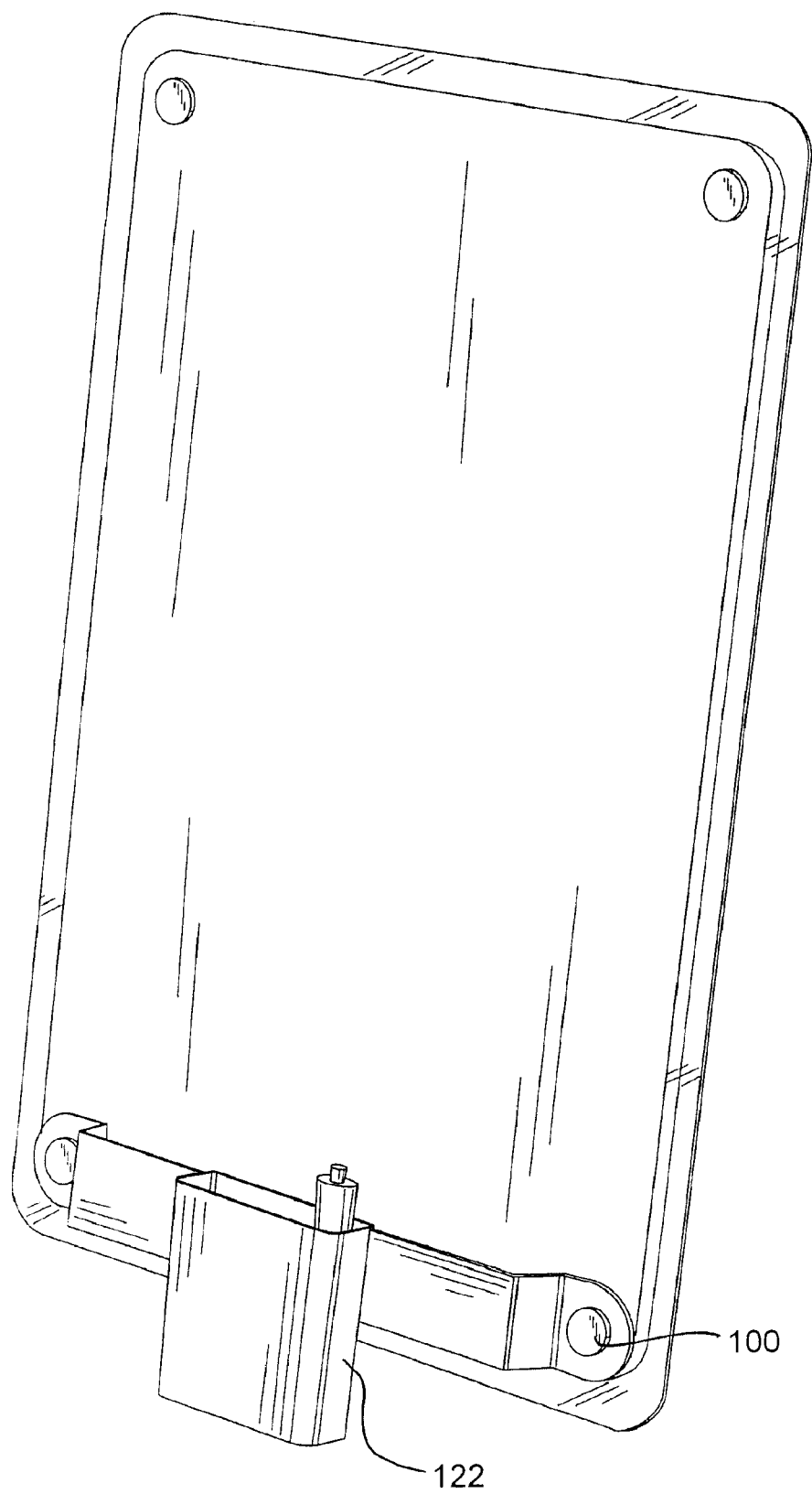
FIG. 18 is a perspective view of another alternate embodiment of a board assembly constructed in accordance with teachings of the invention.
Figure 21:
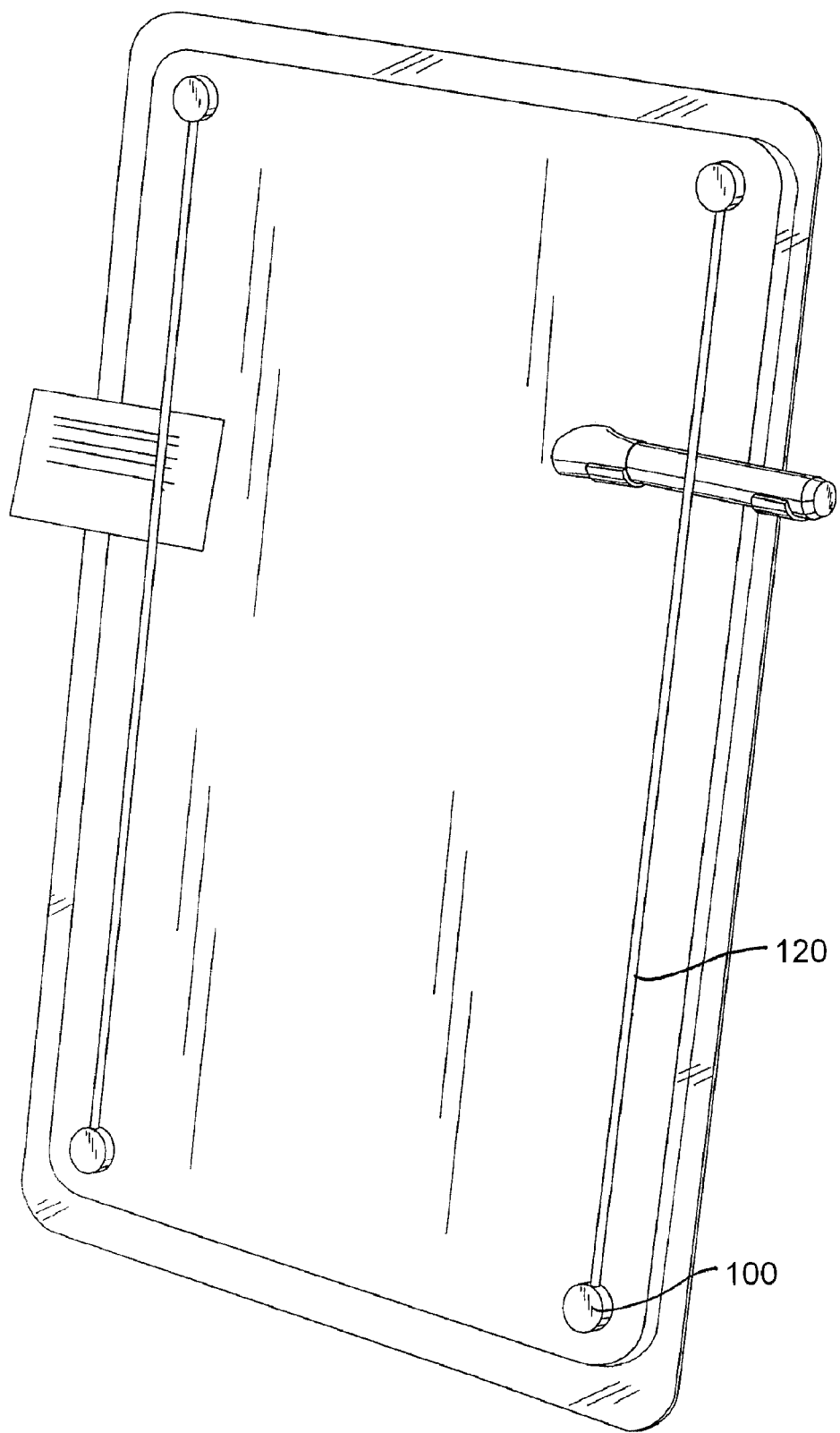
FIG. 21 is a perspective view of another alternate embodiment of a board assembly constructed in accordance with teachings of the invention.

The mounting structure 100 may further include attachment points for accessories. As shown in FIGS. 18 and 21, for example, a resilient band 120, tray 122 or the like may be provided between the mounting structures 100.

In order to provide the user additional writing space and/or a further means of customization, the board assembly 150 may additionally include one or more overlay boards or sheets. As shown in FIGS. 14-16, in addition to the board assembly 50 described above, the board assembly 150 may include one or more additional polymeric boards 152. The additional polymeric boards 152 may be coupled to the board assembly by way of bores 154 which couple to the existing mounting structure 100 of the board assembly 50, as illustrated in FIG. 16, although alternate structure may be provided. For example, the additional polymeric boards 152 may be provided with such bores 154, and additionally include one or more channel or flange portions along one or more edges thereof such that the bores 154 would receive the caps 110, and the channel or flange portions would be disposed along the edges of the board assembly 50 to maintain the relative positions.

Insofar as the board assembly 50 provides form and structure upon which to mount the additional polymeric boards 152, the additional polymeric boards 152 themselves may be of a similar thickness to the polymeric board 52 or they may be relatively thin, such that they may be rolled up when not in use for compact storage or transport.

The additional polymeric boards 152 may present an opaque surface such that they provide a clean writing surface, or a transparent or translucent such that the user may view any items or markings beneath the board 152. The boards 152 may include a dry erase surface or, in a more economical version, the surface of the boards 152 themselves may be utilized as a dry erase surface, realizing that they will degrade in appearance over time.

Such additional polymeric boards 152 may be utilized to economically customize the board assembly 150 by sandwiching a customizing sheet, such as a sheet containing a company emblem, between the boards 152, 52. Further, such additional polymeric boards 152 may be utilized to develop additional layers to an arrangement on the board 52 or a sheet placed on the board. For example, a blueprint or layout may be drawn on the dry erase surface 54, 80 of the polymeric board 52 or a sheet displaying the same placed on top of the polymeric board 52. One or more additional polymeric boards 152 may then be laid on top of the board assembly 50 and utilized to add the lighting layout, electrical schematic, and/or plumbing schematic.

It will be appreciated by those of skill in the art that the elements of the board assembly may be of an alternate configuration than those disclosed in the illustrations herein. While this invention has been described with an emphasis upon preferred embodiments, variations of the preferred embodiments can be used, and it is intended that the invention can be practiced otherwise than as specifically described herein. Accordingly, this invention includes all modifications encompassed within the spirit and scope of the invention as defined by the following claims. For example, various aspects of the invention may be practiced simultaneously.

Various features of the invention are set forth in the following claims.

I claim:

1. A display board assembly comprising:
   a polymeric board having edges;
   a non-metallic backing coupled with the polymeric board and configured to engage a mounting surface, the backing being spaced inwardly from the edges of the polymeric board and having a thickness at least two times the thickness of the polymeric board to space the polymeric board from the mounting surface;
   a dry erase surface coupled with the polymeric board;
   a bore extending through at least one of the polymeric board, the backing, and the dry erase surface; and
   a mounting system configured to mount the display board assembly to the mounting surface, the mounting system including
     a mounting protrusion configured to be mounted to the mounting surface and to be received in the bore of the display board assembly; and
     a cap configured to be secured to the mounting protrusion when the mounting protrusion is in the bore to cover the bore and secure the display board assembly to the mounting protrusion.

2. The display board assembly of claim 1, wherein the display board assembly includes a clip applied to at least one of the edges of the polymeric board.

3. The display board assembly of claim 2, wherein the clip includes a channel that receives an edge of the polymeric board.

4. The display board assembly of claim 1, wherein the backing is a foam.

5. The display board assembly of claim 1, wherein the backing has a void.

6. The display board assembly of claim 1, wherein the dry erase surface is spaced from the edges of the polymeric board such that the polymeric board provides the effect of a frame around the dry erase surface.

7. The display board assembly of claim 1, wherein the dry erase surface is magnetic.

8. The display board assembly of claim 1, wherein the polymeric board is translucent.

9. The display board assembly of claim 8, wherein the polymeric board is transparent.

10. The display board assembly of claim 8, wherein the backing is larger than the dry erase surface such that the backing provides the effect of a matting around the dry erase surface.

11. The display board assembly of claim 1, wherein at least one of the backing, the polymeric board, and the dry erase surface includes a void configured to receive an item to be retained by the display board assembly.

12. The display board assembly of claim 11, wherein the void is in the backing, and wherein the polymeric board is translucent and covers the void such that an item received in the void is visible through the polymeric board.

13. The display board assembly of claim 12, wherein the void is accessible from a side of the backing adjacent the mounting surface.

14. The display board assembly of claim 11, wherein the void is formed in each of the backing, the polymeric board, and the dry erase surface, providing access through the dry erase surface, the polymeric board, and the backing to the mounting surface.

15. The display board assembly of claim 11, wherein the dry erase surface and the polymeric board each include a void providing access through the dry erase surface and the polymeric board to the backing.

16. The display board assembly of claim 15, wherein the item received in the void is a pushpin that sticks into the backing.

17. The display board assembly of claim 11, wherein the backing is foam.

18. The display board assembly of claim 1, wherein the polymeric board and the dry erase surface are at least partially arcuately-shaped.

19. The display board assembly of claim 1, wherein the mounting protrusion includes threads for receiving mating threads on the cap to secure the cap to the mounting protrusion.

20. The display board assembly of claim 1, wherein the mounting protrusion is a cup shaped grommet.

21. The display board assembly of claim 1, further comprising a coupler configured to secure the mounting protrusion to the mounting surface.

22. The display board assembly of claim 1, wherein the bore extends through each of the polymeric board, the backing, and the dry erase surface.

23. The display board assembly of claim 1, wherein the mounting system is operable to allow adding an additional polymeric board to the display board assembly over the dry erase surface.

24. The display board assembly of claim 1, further comprising an accessory coupled to the display board by the mounting system.

25. The display board assembly of claim 24, wherein the accessory is a resilient band.

26. The display board assembly of claim 24, wherein the accessory is a tray.

27. The display board assembly of claim 2, wherein the clip includes a tray.

28. A display board assembly comprising:
   a polymeric board having edges;
   a non-metallic backing coupled with the polymeric board and configured to engage a mounting surface, the backing being spaced inwardly from the edges of the polymeric board and having a thickness at least two times the thickness of the polymeric board to space the polymeric board from the mounting surface; and
   a dry erase surface coupled with the polymeric board;

wherein at least one of the backing, the polymeric board, and the dry erase surface includes a void configured to receive an item to be retained by the display board assembly; and wherein the void is in the backing, and wherein the polymeric board is translucent and covers the void such that an item received in the void is visible through the polymeric board.

29. The display board assembly of claim 28, wherein the void is accessible from a side of the backing adjacent the mounting surface.

30. A display board assembly comprising:

a polymeric board having edges;

a non-metallic backing coupled with the polymeric board and configured to engage a mounting surface, the backing being spaced inwardly from the edges of the polymeric board and having a thickness at least two times the thickness of the polymeric board to space the polymeric board from the mounting surface; and a dry erase surface coupled with the polymeric board;

wherein at least one of the backing, the polymeric board, and the dry erase surface includes a void configured to receive an item to be retained by the display board assembly; and wherein the void is formed in each of the backing, the polymeric board, and the dry erase surface, providing access through the dry erase surface, the polymeric board, and the backing to the mounting surface.

31. A display board assembly comprising:

a polymeric board having edges;

a non-metallic backing coupled with the polymeric board and configured to engage a mounting surface, the backing being spaced inwardly from the edges of the polymeric board and having a thickness at least two times the thickness of the polymeric board to space the polymeric board from the mounting surface; and a dry erase surface coupled with the polymeric board;

wherein at least one of the backing, the polymeric board, and the dry erase surface includes a void configured to receive an item to be retained by the display board assembly; and wherein the dry erase surface and the polymeric board each include a void providing access through the dry erase surface and the polymeric board to the backing.

32. The display board assembly of claim 31, wherein the item received in the void is a pushpin that sticks into the backing.

* * * * *